United States Patent
Nachtegall et al.

(10) Patent No.: US 10,991,121 B2
(45) Date of Patent: Apr. 27, 2021

(54) MOVEMENT TRACKING OF OPERATOR-FACING CAMERAS

(71) Applicant: GM Global Technology Operations LLC, Detroit, MI (US)

(72) Inventors: Debbie E. Nachtegall, Rochester Hills, MI (US); Nathan P. Makarewicz, Oxford, MI (US); Paul W. Alexander, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 57 days.

(21) Appl. No.: 16/201,618

(22) Filed: Nov. 27, 2018

(65) Prior Publication Data
US 2020/0167951 A1    May 28, 2020

(51) Int. Cl.
*G06T 7/73*    (2017.01)

(52) U.S. Cl.
CPC ...... *G06T 7/74* (2017.01); *G06T 2207/30201* (2013.01); *G06T 2207/30204* (2013.01); *G06T 2207/30244* (2013.01); *G06T 2207/30268* (2013.01)

(58) Field of Classification Search
CPC ............. G06T 7/74; G06T 2207/30201; G06T 2207/30204; G06T 2207/30244; G06T 2207/30268; G06T 2207/30252; G06K 9/3216; G06K 9/00228; G06K 9/209; B60N 2/002; B60N 2/015; B60N 2/0224; B60N 2/0232
See application file for complete search history.

(56) References Cited

U.S. PATENT DOCUMENTS

| | | | |
|---|---|---|---|
| 9,773,179 B2 | 9/2017 | Vicente et al. | |
| 2004/0129478 A1* | 7/2004 | Breed | B60N 2/002 180/273 |
| 2011/0241862 A1 | 10/2011 | Debouk et al. | |
| 2012/0057022 A1* | 3/2012 | Nechiporenko | G06K 9/209 348/135 |
| 2013/0131907 A1 | 5/2013 | Green et al. | |

(Continued)

OTHER PUBLICATIONS

Tesla Model S Heated Seat-Infrared, YouTube, 2015 https://www.youtube.com/watch?v=2OCtmbTv4Cg (Year: 2015).*

*Primary Examiner* — Jianxun Yang
(74) *Attorney, Agent, or Firm* — Quinn IP Law

(57) ABSTRACT

Systems and methods for optimizing operator-state detection including tracking position of an operator-facing camera are described. Systems and methods include receiving a first image captured by an operator-facing camera, detecting a first position of the operator-facing camera with respect to the calibration object, ascertaining the first position with respect to at least one fiducial marker within a passenger compartment of a vehicle, capturing, via controller, a second image using the operator-facing camera, determining the second image is captured by the operator-facing camera from a second position with respect to the at least one fiducial marker, and analyzing, based on determining the second image is captured by the operator-facing camera from the second position, the second image to identify facial features of the operator. The receiving, detecting, ascertaining, determining, and analyzing are performed via a controller. The first image includes a calibration object disposed at a predetermined location.

20 Claims, 4 Drawing Sheets

(56) References Cited

U.S. PATENT DOCUMENTS

| | | |
|---|---|---|
| 2013/0321629 A1 | 12/2013 | Zhang et al. |
| 2014/0139341 A1 | 5/2014 | Green et al. |
| 2014/0204193 A1 | 7/2014 | Zhang et al. |
| 2014/0205143 A1 | 7/2014 | Zhang et al. |
| 2014/0240478 A1 | 8/2014 | Nachtegall et al. |
| 2017/0174203 A1 | 6/2017 | Brown et al. |
| 2018/0342082 A1* | 11/2018 | Lewis ................. B60R 1/00 |
| 2019/0206084 A1* | 7/2019 | Noble ................. G06T 7/80 |

* cited by examiner

MOVEMENT TRACKING OF OPERATOR-FACING CAMERAS

INTRODUCTION

The disclosure relates to the field of operator monitoring systems and, more particularly, to systems and methods for tracking movement of operator monitoring cameras.

Operator monitoring systems are configured to ascertain a state of the operator from a captured image, determine whether the operator is, for example, inattentive, provide at least one signal to the operator to restore alertness, and/or provide signals to vehicle control systems to avoid an unintended consequence that could result from an inattentive operator. For example, warning systems may be enabled to provide warning signals, such as visual or audial warning signals, to alert the operator that he or she is determined to be inattentive. Further, vehicle control systems, such as automatic braking and automatic steering systems, may be actuated to bring the vehicle to a stop if it is determined that the operator has not become attentive even after the warning signal.

SUMMARY

It is desirable to optimize detection of a state of a vehicle operator. Systems and methods as disclosed herein optimize detection of the state of the vehicle operator by detecting movement and/or position of an operator-facing camera within the passenger compartment of the vehicle.

According to aspects of the present disclosure, a method includes receiving a first image captured by an operator-facing camera, detecting a first position of the operator-facing camera with respect to the calibration object, ascertaining the first position with respect to at least one fiducial marker within a passenger compartment of a vehicle, capturing, via controller, a second image using the operator-facing camera, determining the second image is captured by the operator-facing camera from a second position with respect to the at least one fiducial marker, and analyzing, based on determining the second image is captured by the operator-facing camera from the second position, the second image to identify facial features of the operator. The receiving, detecting, ascertaining, determining, and analyzing are performed via a controller. The first image includes a calibration object disposed at a predetermined location. The operator-facing camera is movable within the passenger compartment. The second image includes an operator and the at least one fiducial marker.

According to further aspects of the present disclosure, the calibration object is a grid pattern.

According to further aspects of the present disclosure, the calibration object is directly attached to a calibration apparatus coupled to a steering wheel of an adjustable steering apparatus.

According to further aspects of the present disclosure, the operator-facing camera is co-located with a steering wheel of an adjustable steering apparatus.

According to further aspects of the present disclosure, the at least one fiducial marker includes a structure within the passenger compartment.

According to further aspects of the present disclosure, the at least one fiducial marker includes an infrared-emitting object.

According to further aspects of the present disclosure, the infrared-emitting object is integrated within a textile.

According to further aspects of the present disclosure, the infrared-emitting object passively emits infrared radiation.

According to further aspects of the present disclosure, the infrared-emitting object actively emits infrared radiation, and the infrared-emitting object is selectively actuated to provide infrared radiation to the operator-facing camera while capturing the second image.

According to further aspects of the present disclosure, the method further includes determining a configuration of an operator seat, and analyzing the second image to identify facial features of the operator is further based on the configuration of the operator seat.

According to aspects of the present disclosure, a vehicle includes a passenger compartment configured to receive an operator therein, an operator-facing camera configured to capture images of the passenger compartment including the operator, and a controller in communication with the operator-facing camera. The operator-facing camera is movable within the passenger compartment of the vehicle. The controller is programmed to receive a first image including a calibration object disposed at a predetermined location captured by the operator-facing camera, ascertain the first position with respect to at least one fiducial marker within the passenger compartment, capture a second image using the operator-facing camera, determine whether the second image is captured by the operator-facing camera from a second position with respect to the at least one fiducial marker, and analyze, based on determining the second image is captured by the operator-facing camera from the second position, the second image to identify facial features of the operator. The second image includes the operator and the at least one fiducial marker.

According to further aspects of the present disclosure, the calibration object is a plurality of crosshairs.

According to further aspects of the present disclosure, the calibration object is directly attached to a calibration apparatus coupled to a steering wheel of an adjustable steering apparatus.

According to further aspects of the present disclosure, the operator-facing camera is co-located with a steering wheel of an adjustable steering apparatus.

According to further aspects of the present disclosure, the at least one fiducial marker includes a structure within the passenger compartment.

According to further aspects of the present disclosure, the at least one fiducial marker includes an infrared-emitting object.

According to further aspects of the present disclosure, the infrared-emitting object is integrated within a textile.

According to further aspects of the present disclosure, the infrared-emitting object passively emits infrared radiation.

According to further aspects of the present disclosure, the infrared-emitting object is configured to actively emit infrared radiation and the infrared-emitting object is configured to be selectively actuated to provide infrared radiation to the operator-facing camera while capturing the second image.

According to further aspects of the present disclosure, the controller is further programmed to determine a configuration of an operator seat, and wherein analyzing the second image to identify facial features of the operator is further based on the configuration of the operator seat.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The drawings are illustrative and not intended to limit the subject matter defined by the claims. Exemplary aspects are discussed in the following detailed description and shown in the accompanying drawings in which:

DETAILED DESCRIPTION

When ascertaining the state of an operator of a vehicle, such as vehicle 1, features of the operator are ascertained by an operator monitoring system. Identifying these features and ascertaining the state of the operator is complicated by vehicle-to-vehicle and instance-to-instance variations. For example, algorithms attempting to identify operator features accommodate a broad search space because distances to and geometries of vehicle or cabin features vary between makes, models, model years, trims, etc.; the configuration of the passenger compartment may vary between makes, models, model years, trims, etc.; distances to vehicle or cabin features may vary during manufacturing, even in vehicles having identical specifications, due to a different initialization location arising from positional adjustability of the steering wheel and/or occupant seat; different heights and facial features of operators; unknown illumination conditions reducing reliability of detection of the facial features; and/or abrupt changes in the operator's head pose are difficult to track in video streams or image data captured by the camera device.

Beneficially, systems and methods in accordance with the present disclosure may optimize functioning of an operator monitoring system. Such optimizations may include optimizing the identification of facial features, reducing processing time required to identify facial features, reducing data storage requirements for analysis of facial features, and/or reducing misidentification of an operator's state. Further, systems and methods in accordance with the present disclosure may optimize vehicle function through accurate assessment of an operator state. Such optimized vehicle function may include prolonged operation in autonomous and semi-autonomous modes to thereby reduce operator interventions with the vehicle and reduced handoffs between autonomous and non-autonomous modes. According to aspects of the present disclosure, these and other benefits are accomplished by systems and methods of tracking spatial placement of an operator-facing camera that is movable, for example, during adjustments to optimize visibility and comfort of an operator.

Figure 1:
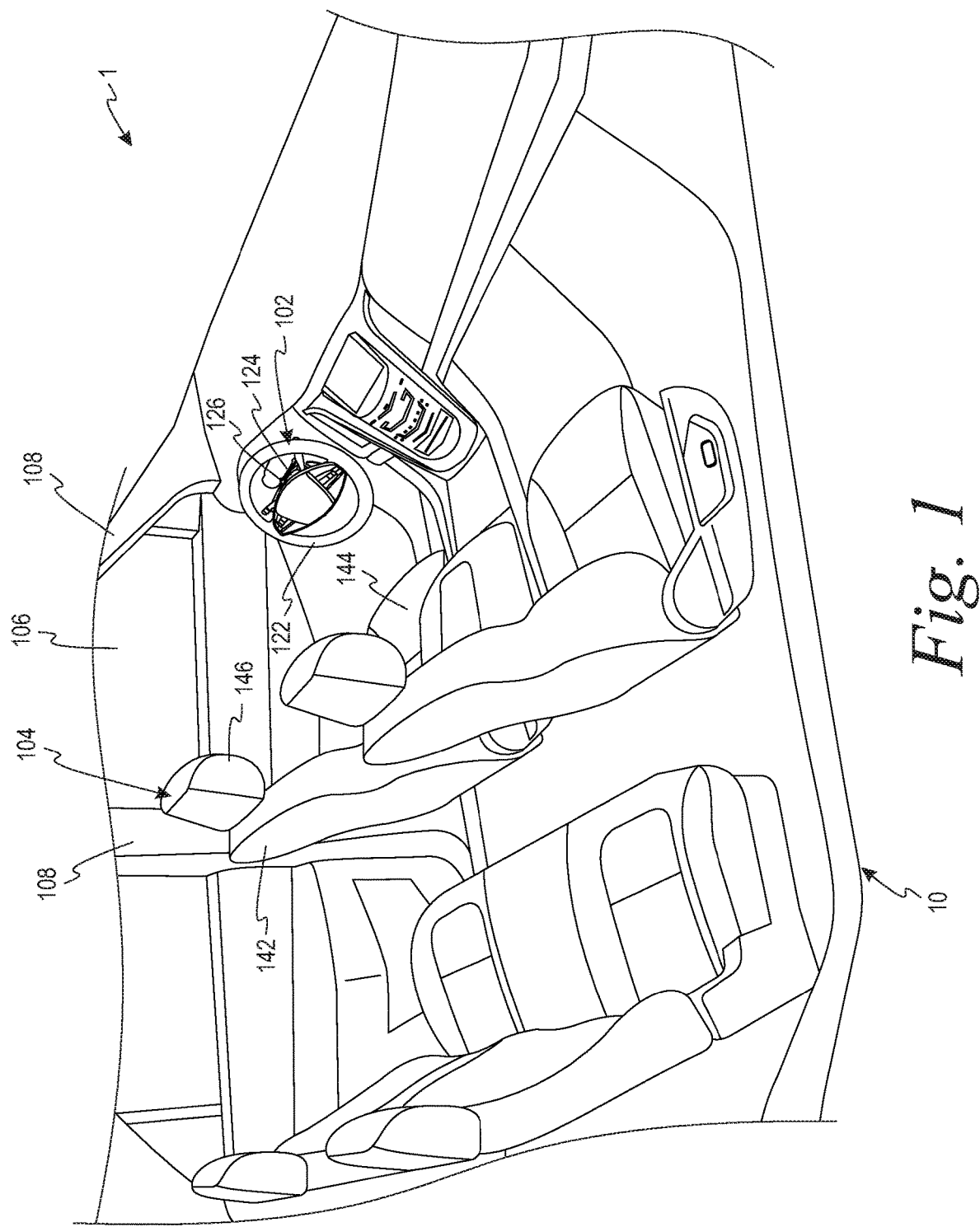
FIG. 1 is a schematic illustration of a passenger compartment of a vehicle.

Referring now to FIG. 1, a vehicle 1 is shown. The vehicle 1 includes a passenger compartment 10 including an adjustable steering apparatus 102, an operator seat 104, windows 106, pillars 108, and the like. The adjustable steering apparatus 102 is movably positioned relative to the vehicle 1. As used herein, the term passenger compartment 10 may also refer to structural portions of the vehicle 1 that are generally not visible during operation of the vehicle, such as door jambs, door latches, an interior of the roof which may be later obscured by the headliner, untrimmed pillars, and the like. The adjustable steering apparatus 102 includes a steering wheel 122, a body 124, and an operator-facing camera 126 such that movement of the adjustable steering apparatus 102 in space results in movement of the steering wheel 122, the body 124, and the operator-facing camera 126.

The steering wheel 122 is rotatable relative to the body 124. The body 124 includes the steering wheel 122 and the operator-facing camera 126 coupled thereto. The steering wheel 122 and/or the operator-facing camera 126 may be directly attached to the body 124. The body 124 may house a number of steering-control components therein. The steering-control components are configured to assist in steering of the vehicle 1 and may include sensors, controllers, actuators, communications interfaces, mechanical couplings, and the like to assist in effecting steering of the vehicle 1.

The operator-facing camera 126 is configured to capture images of at least one operator of the vehicle. The operator-facing camera 126 may capture predetermined wavelengths of light including one or more of infrared light, visible light, and ultraviolet light. The operator-facing camera 126 may be disposed a fixed distance from the steering wheel 122 or may be disposed a variable distance from the steering wheel 122. In some aspects, the operator-facing camera 126 is co-located with the steering wheel 122 such that adjustment of the steering wheel 122 to optimize comfort of the operator results in a correlated adjustment of the operator-facing camera 126.

The operator seat 104 is configured to receive an operator of the vehicle 1. The operator seat 104 may be translated to different positions within passenger compartment 10, such as different distances from a front of the vehicle 1 or different heights from a floor of the vehicle 1. The operator seat 104 may be placed into different configurations, such as a backrest 142 being pivotably positioned relative to a base 144 of the operator seat 104 and a head restraint 146 being extendably positioned relative to the backrest 142.

The vehicle 1 further includes one or more controllers (not illustrated). The terms "controller," "control module," "control," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean a controller executable instruction sets including calibrations and look-up tables. In some aspects, the controller includes a central processing unit (CPU).

To appropriately control operation of the vehicle 1, operator-monitoring system, or subcomponents thereof, the controller may include a processor (e.g., a microprocessor) and at least one memory, at least some of which is tangible and non-transitory. The memory may store controller-executable instruction sets, and the processor may execute the controller executable instruction sets stored in the memory. The memory may be a recordable medium that participates in providing computer-readable data or process instructions.

The recordable medium may take many forms, including but not limited to non-volatile media and volatile media.

Non-volatile media for the controller may include, for example, optical or magnetic disks and other persistent memory. Volatile media may include, for example, dynamic random access memory (DRAM), which may constitute a main memory. The memory of the controller may also include a solid-state medium, a floppy disk, a flexible disk, hard disk, magnetic tape, another magnetic medium, a CD-ROM, DVD, another optical medium, combinations thereof, and the like.

The controller-executable instruction sets may be transmitted by one or more transmission media, including coaxial cables, copper wire or traces, fiber optics, combinations thereof, and the like. For example, the transmission media may include a system bus that couples two or more components of the vehicle 1, operator-monitoring system, or subcomponents, such as the controller and the operator-facing camera 126.

The controller may be configured to communicate with or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms of the controller or accessible thereby may be stored in the memory and automatically executed to provide the required functionality for the relevant components.

Figure 2:
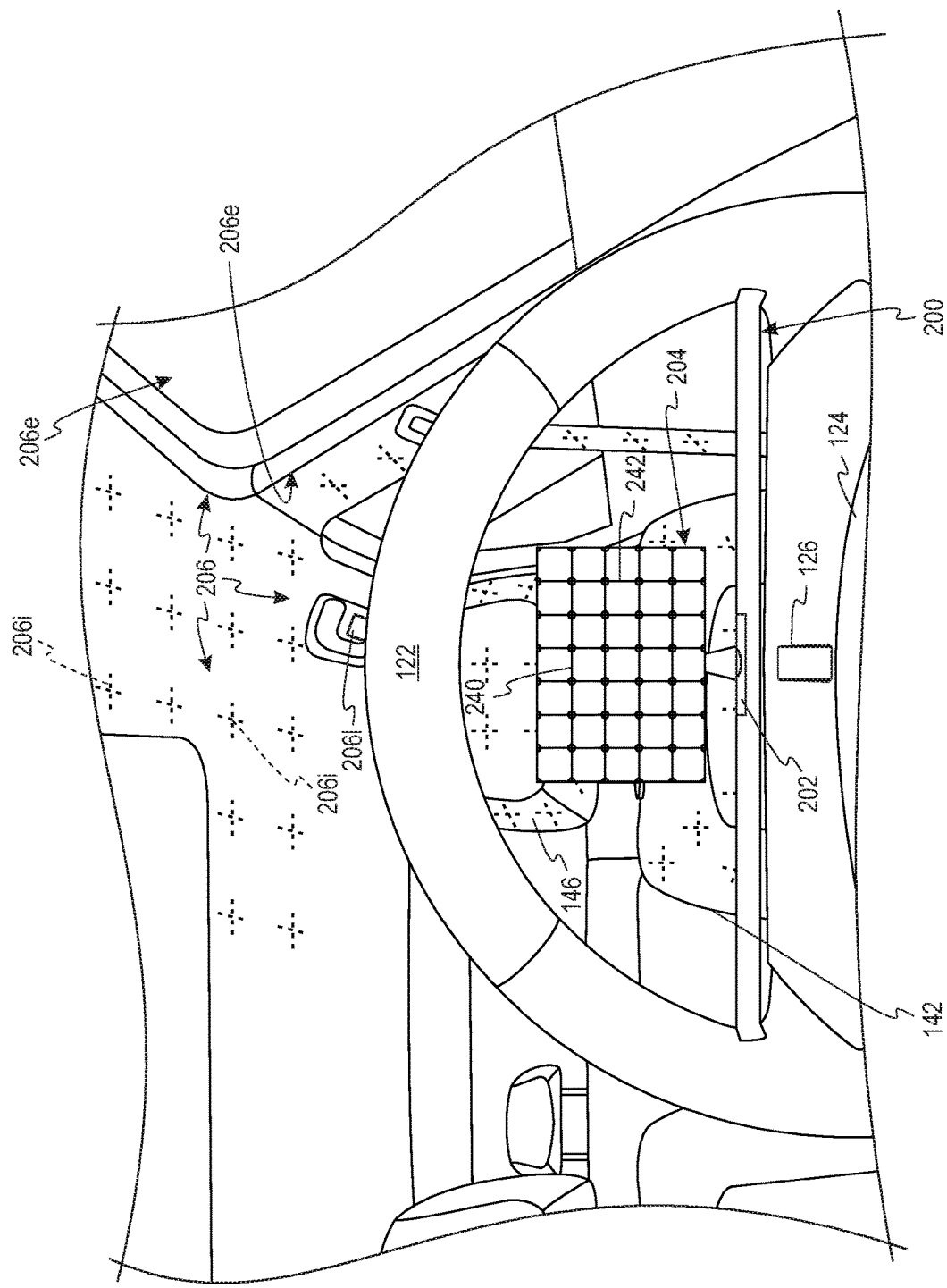
FIG. 2 is a schematic illustration of a view of the passenger compartment of FIG. 1 including a calibration apparatus.

FIG. 2 illustrates the passenger compartment 10 with a calibration apparatus 200 disposed therein. The calibration apparatus 200 is configured to assist in determining the location and orientation of the operator-facing camera 126 in three-dimensional space. In some aspects, the calibration apparatus 200 includes a level mechanism 202 and a calibration object 204. The level mechanism 202 is configured to determine whether a surface is level and/or plumb. In some aspects, the level mechanism 202 is an electronic level or a spirit/bubble level.

The calibration object 204 is configured to provide information for determining the location and/or orientation of the operator-facing camera 126. For example, the information may include a plurality of intersecting lines. In some aspects, the plurality of intersecting lines is arranged as a plurality of crosshairs. In some further aspects, at least five crosshairs are used and arranged in a predetermined pattern. In some aspects, the plurality of intersecting lines forms a grid pattern. The features of the calibration object 204 are oriented with respect to the level mechanism 202 such that images of the calibration object 204 captured by the operator-facing camera 126 may be used to determine level, plumb, and/or distance. The features of the calibration object 204 are superimposed over an imager space and an offset generated.

In the illustrated embodiment, the calibration object 204 is a grid having squares of known sizes. A captured image of the calibration object 204 may be analyzed to determine distortions of horizontal lines 240 and vertical lines 242. Distortions of the horizontal lines 240 and vertical lines 242 may be corrected such that level and plumb of captured images may be determined.

The calibration object 204 is disposed at a predetermined location within the passenger compartment 10. In some aspects, the predetermined location is a position known relative to the operator-facing camera 126. In some aspects, the predetermined location is a position known relative to the steering wheel 122. In some aspects, the predetermined location is a position known relative to the passenger compartment 10.

Figure 3:
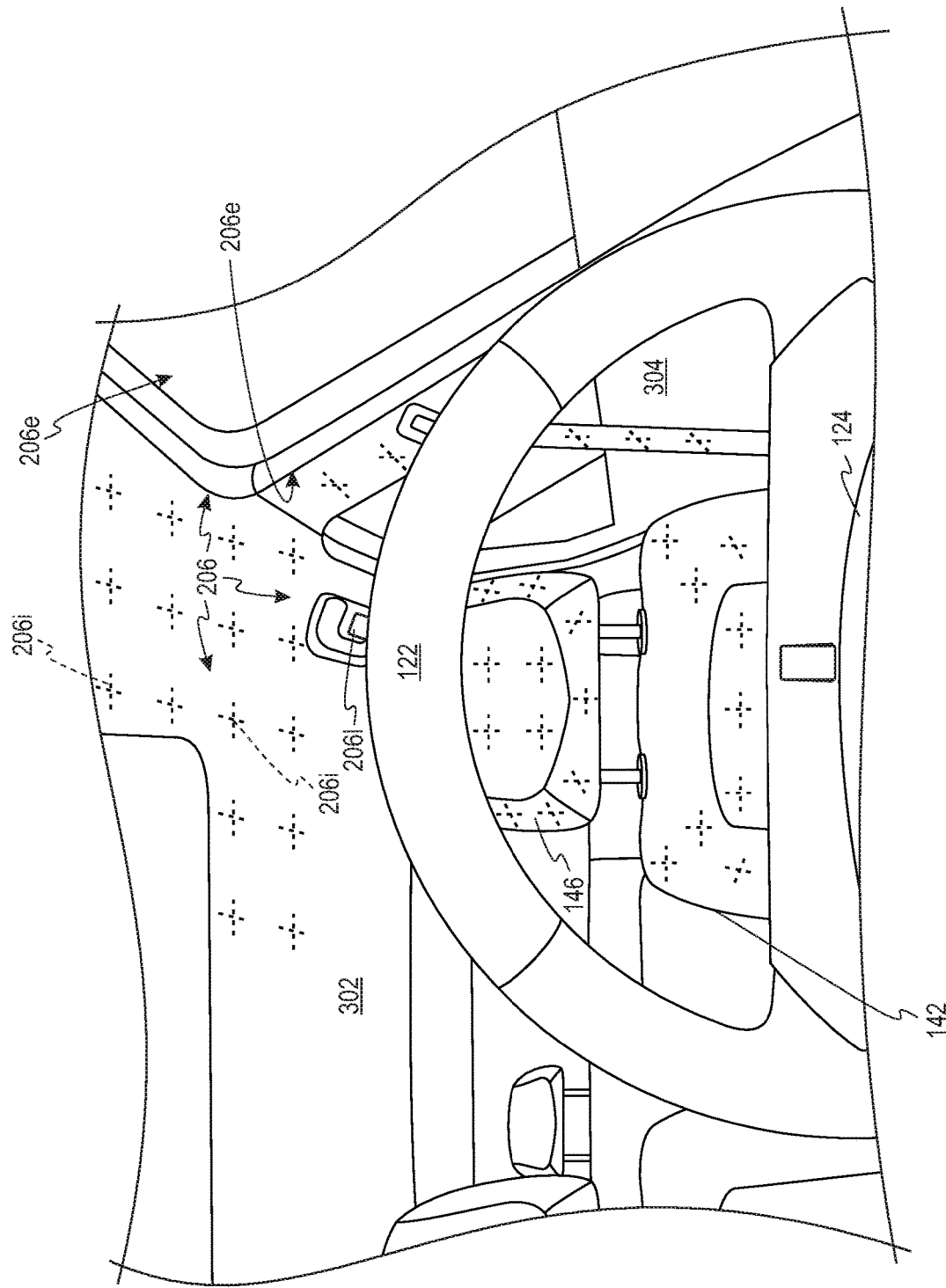
FIG. 3 is a schematic illustration of the passenger compartment of FIG. 2 without the calibration apparatus.

FIG. 3 illustrates the passenger compartment 10 of the vehicle 1 without the calibration apparatus 200. The passenger compartment 10 includes fiducial markers 206 for use as positional references after initialization of the operator-facing camera 126. In some aspects, the fiducial markers 206 include radiation-emitting objects, such as lamps 206l or infrared-emitting objects 206i. In some aspects, the fiducial markers 206 include ersatz fiducials 206e, such as structures within the passenger compartment 10. The ersatz fiducials 206e may include the operator seat 104, windows 106, pillars 108, and the like.

Beneficially, the fiducial markers may be detectable by the operator-facing camera 126 without being generally perceptible by the operator. For example, the fiducial markers 206 may be radiation-emitting objects that emit radiation outside of the visible spectrum, such as one or more infrared-emitting objects 206i. The infrared-emitting objects 206i are configured to emit infrared radiation such that boundaries between the infrared-emitting objects 206i and adjacent features are detectable in images captured by the operator-facing camera 126.

The infrared radiation may be actively or passively emitted. In some aspects, the active emission is in response to an actuating signal, such as an electrical current being passed through the infrared-emitting object 206i. Beneficially, in some aspects, the actuating signal may be less than, for example, 1.0 amp. In some aspects, the actuating signal may be less than 0.5 amp. In some aspects, the passive emission is a result of the material achieving predetermined conditions, such as the infrared-emitting object 206i being at the ambient temperature of the passenger compartment 10.

Beneficially, use of infrared-emitting objects 206i provide for optimized detection of the position of the operator-facing camera 126 even when lighting conditions inhibit detection of other fiducial markers 206, such as windows 106 and pillars 108. For example, in low-light conditions, the boundary between a window 106 and an adjacent pillar 108 may be obscured such that a shape-matching algorithm cannot discern the boundary within a sufficient margin of error. In some aspects, the shape-matching algorithm analyzes surfaces, features, material appearances, lighting, shading, combinations thereof, and the like within images to determine candidate objects and borders between those objects, and matches the candidate object to known objects stored or obtained from previous images.

In some aspects, the infrared-emitting objects 206i are integrated within textiles. Textile-integrated infrared-emitting objects 206i may be, for example, multi-filament yarns coated and/or impregnated with an infrared-generating material. The filaments may include or be formed from polymeric materials (e.g., polyester). In some aspects, the infrared-generating material is coated on and/or impregnated into one or more individual filaments within the yarn. Additionally or alternatively, the infrared-generating material is coated on and/or impregnated into the yarn as a whole. In some aspects, the multi-filament yarns include one or more electrically conductive filaments.

Beneficially, textile-integrated infrared-emitting objects 206i may be located or patterned within existing interior textile trim components, such as the headliner 302, the pillars 108, seats 104, head restraints 146, door panels 304, seatbelt, portions thereof, and the like. The multi-filament yarns are generally amenable to one or more textile-manufacturing methods including weaving, knitting, sewing, embroidering, etc. Beneficially, power-delivery elements may also be integrated within the textile trim components in the form of, for example, conductive yarns to thereby reduce the number of ancillary components required to actuate the infrared-emitting objects 206i and optimize installation of the infrared-emitting objects 206i. Further, the infrared-emitting objects 206i may be implemented without disturbing class A surfaces even if there is a difference in visual appearance between the infrared-emitting objects 206i and the desired interior textile trim. For example, a multi-bed knitting machine may be used to integrate the infrared-emitting objects 206i into the interior textile trim components without altering the visual appearance of the respective class A surface.

Figure 4:
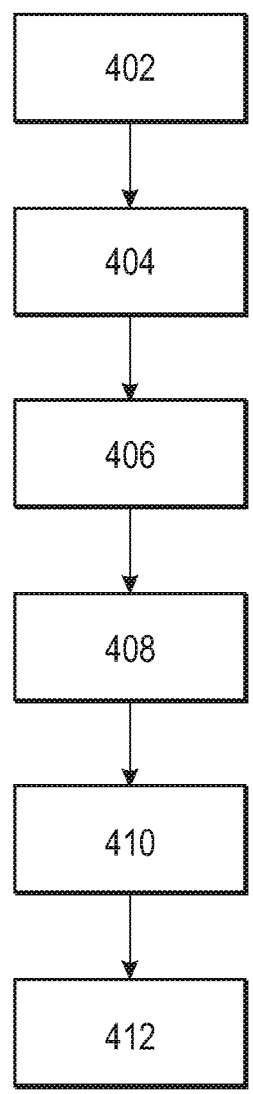
FIG. 4 is a flowchart of a method of optimized identification of features, according to aspects of the present disclosure.

Referring now to FIG. 4, a method of optimized identification of features is shown. The method includes obtaining 402, via the operator-facing camera 126, a first image including the calibration object 204 disposed at the predetermined location. The method then detects 404, via the controller, the first position with respect to the calibration object 204.

The method also ascertains 406, via the controller, the first position with respect to at least one of the fiducial markers 206 within the passenger compartment 10. In some aspects, the fiducial marker 206 is included within the first image. Additionally or alternatively, the fiducial marker 206 is within an additional image of the passenger compartment 10 that is captured after removal of the calibration object 204, and prior to movement of the operator-facing camera 126 to another position.

The first position may be ascertained, for example, using a single fiducial marker 206 if information, such as the size of the marker, is known. The known size may be a technician-inputted value, a standardized size, or an encoded value within the fiducial marker itself. In some aspects, the technician-inputted value is received by the controller through an I/O device. In some aspects, the standardized size may be, for example, a predetermined size of the symbol that is used across applicable makes, models, model years, etc. In some aspects, the encoded value may be, for example, machine-readable information within the fiducial marker 206.

Additionally or alternatively, the first position may be known relative to a plurality of fiducial markers 206. Beneficially, use of a plurality of fiducial markers 206 optimizes robustness of the system. In some aspects, robustness is optimized because identification of the plurality of fiducial markers 206 allows relative values, such as distance between individual ones of the fiducial markers 206 to provide useful information regarding location of the operator-facing camera 126 without requiring knowledge of the particular size of, shape of, or distance to the fiducial markers 206. In some aspects, robustness is optimized because identification of the plurality of fiducial markers 206 allows for identification of positions of the operator-facing camera 126 using as few as a single fiducial marker 206 even though the absolute size of, shape of, or distance to the fiducial marker 206 is not known by the controller. For example, factors such as enlargement or reduction of the fiducial marker 206 captured relative to that of the fiducial marker captured at the first position, skewing of the shape of the fiducial marker 206, and other optical features may be used to determine movement of the operator-facing camera 126 relative to the fiducial marker 206.

Information regarding the fiducial markers 206 and the initial position of the operator-facing camera 126 may be stored in volatile or non-volatile memory. Beneficially, the stored information may be correlated to other stored information, such as operator-identifying information. In some aspects, the operator-identifying information includes, seat configurations stored in memory, particular key or keyfobs used to start the vehicle, detectable radio-frequency based information (such as information received from a mobile device), combinations thereof, and the like.

The method further includes capturing 408, via the operator-facing camera 126, a second image including the vehicle operator and at least one of the fiducial markers 206. The method also determines 410, via the controller, that the second image is captured by the operator-facing camera from a second position with respect to the fiducial marker 206. In some aspects, determining differences in identified fiducial markers 206, such as changes to size, shape, relative distances to other fiducial markers, etc., and combinations thereof may be used to determine that the operator-facing camera 126 has moved from the first or a previously known position. Additionally or alternatively, actuation of an adjustment to a relevant component, such as adjustment of the operator seat 104 or the adjustable steering apparatus 102 may be used by the controller to indicate that the operator-facing camera 126 has moved from the first or the previously known position.

The method then analyzes 412 the second image to identify facial features of the operator based on determining 410 the second image is captured by the operator-facing camera 126 from the second position. Beneficially, using the determined second position, processes to identify the facial features may be optimized. For example, the search space for identifying the facial features of the operator may be reduced by narrowing the possible volume that the operator may occupy. Additionally or alternatively, a predetermined subset of the second image is analyzed for facial features of the operator based on determining the second image is captured by the operator-facing camera 126 from the second position. Yet additionally or alternatively, a scaling factor applied to potential sizes of facial features or potential relations between facial features is increased or decreased based on the operator-facing camera 126 being located at the second position relative to the first position. For example, both potential sizes of and potential distanced between facial features is reduced for an image captured from further away from the operator than for an image captured from closer to the operator.

Beneficially, systems and methods as described herein may be used to correct for rotation of the operator-facing camera 126, thereby increasing locations for placement of the operator-facing camera 126.

As used herein, unless the context clearly dictates otherwise: the words "and" and "or" shall be both conjunctive and disjunctive, unless the context clearly dictates otherwise; the word "all" means "any and all" the word "any" means "any and all"; the word "including" means "including without limitation"; and the singular forms "a", "an", and "the" includes the plural referents and vice versa.

As understood by one of skill in the art, the present disclosure is susceptible to various modifications and alternative forms, and some representative embodiments have been shown by way of example in the drawings and described in detail above. It should be understood, however, that the novel aspects of this disclosure are not limited to the particular forms illustrated in the appended drawings. Rather, the disclosure is to cover all modifications, equivalents, combinations, sub-combinations, permutations, groupings, and alternatives falling within the scope and spirit of the disclosure and as defined by the appended claims.

While the best modes for carrying out the disclosure have been described in detail, those familiar with the art to which this disclosure relates will recognize various alternative designs and embodiments for practicing the disclosure within the scope of the appended claims.

What is claimed is:

1. A method comprising:
receiving, via a controller, a first image captured by an operator-facing camera, the first image including a calibration object that is directly attached to a calibration apparatus, and the calibration apparatus is disposed at a predetermined location within a passenger compartment of a vehicle, the operator-facing camera being movable within the passenger compartment;
detecting a first position of the operator-facing camera with respect to the calibration object;
ascertaining the first position with respect to at least one fiducial marker disposed within the passenger compartment;
capturing a second image using the operator-facing camera, the second image including an operator and the at least one fiducial marker;
determining whether the second image is captured by the operator-facing camera from a second position with respect to the at least one fiducial marker; and
analyzing, based on determining the second image is captured by the operator-facing camera from the second position, the second image to identify facial features of the operator.

2. The method of claim 1, wherein the calibration object is a plurality of crosshairs.

3. The method of claim 1, wherein the calibration apparatus is removably coupled to a steering wheel of an adjustable steering apparatus.

4. The method of claim 1, wherein the operator-facing camera is co-located with a steering wheel of an adjustable steering apparatus.

5. The method of claim 1, wherein the at least one fiducial marker includes a structure within the passenger compartment.

6. The method of claim 1, wherein the at least one fiducial marker includes an infrared-emitting object.

7. The method of claim 6, wherein the infrared-emitting object is integrated within a textile.

8. The method of claim 6, wherein the infrared-emitting object passively emits infrared radiation.

9. The method of claim 6, wherein the infrared-emitting object actively emits infrared radiation and wherein the infrared-emitting object is selectively actuated to provide infrared radiation to the operator-facing camera while capturing the second image.

10. The method of claim 1, further comprising determining a configuration of an operator seat, wherein analyzing the second image to identify facial features of the operator is further based on the configuration of the operator seat.

11. A vehicle comprising:
a passenger compartment configured to receive an operator therein;
an operator-facing camera configured to capture images of the passenger compartment including the operator, the operator-facing camera being movable within the passenger compartment of the vehicle; and
a controller in communication with the operator-facing camera, the controller being programmed to:
receive a first image captured by the operator-facing camera, the first image including a calibration object that is directly attached to a calibration apparatus, and the calibration apparatus is disposed at a predetermined location within the passenger compartment;
detect a first position of the operator-facing camera with respect to the calibration object;
ascertain the first position with respect to at least one fiducial marker disposed within the passenger compartment;
capture a second image using the operator-facing camera, the second image including the operator and the at least one fiducial marker;
determine whether the second image is captured by the operator-facing camera from a second position with respect to the at least one fiducial marker; and
analyze, based on determining the second image is captured by the operator-facing camera from the second position, the second image to identify facial features of the operator.

12. The vehicle of claim 11, wherein the calibration object is a plurality of crosshairs.

13. The vehicle of claim 11, wherein the calibration apparatus is removably coupled to a steering wheel of an adjustable steering apparatus.

14. The vehicle of claim 11, wherein the operator-facing camera is co-located with a steering wheel of an adjustable steering apparatus.

15. The vehicle of claim 11, wherein the at least one fiducial marker includes a structure within the passenger compartment.

16. The vehicle of claim 11, wherein the at least one fiducial marker includes an infrared-emitting object.

17. The vehicle of claim 16, wherein the infrared-emitting object is integrated within a textile, the infrared-emitting object passively emits infrared radiation, or both.

18. The vehicle of claim 16, wherein the infrared-emitting object is configured to actively emit infrared radiation and wherein the infrared-emitting object is selectively actuated to provide infrared radiation to the operator-facing camera while capturing the second image.

19. The vehicle of claim 11, wherein the controller is further programmed to determine a configuration of an operator seat, and wherein analyzing the second image to identify facial features of the operator is further based on the configuration of the operator seat.

20. An operator monitoring system comprising:
an operator-facing camera configured to capture images of a passenger compartment including an operator, the operator-facing camera being movable within the passenger compartment; and
a controller in communication with the operator-facing camera, the controller being programmed to:
receive a first image captured by the operator-facing camera, the first image including a calibration object that is directly attached to a calibration apparatus, and the calibration apparatus is disposed at a predetermined location within the passenger compartment;
detect a first position of the operator-facing camera with respect to the calibration object;
ascertain the first position with respect to at least one fiducial marker disposed within the passenger compartment;
capture a second image using the operator-facing camera, the second image including the operator and the at least one fiducial marker;
determine whether the second image is captured by the operator-facing camera from a second position with respect to the at least one fiducial marker; and analyze, based on determining the second image is captured by the operator-facing camera from the second position, the second image to identify facial features of the operator.

* * * * *